(12) United States Patent
Perlin

(10) Patent No.: US 11,069,113 B2
(45) Date of Patent: *Jul. 20, 2021

(54) METHOD AND APPARATUS FOR CREATING A COMPUTER SIMULATION OF AN ACTOR

(71) Applicant: Kenneth Perlin, New York, NY (US)

(72) Inventor: Kenneth Perlin, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/982,742

(22) Filed: May 17, 2018

(65) Prior Publication Data

US 2018/0268593 A1 Sep. 20, 2018

Related U.S. Application Data

(63) Continuation of application No. 15/009,424, filed on Jan. 28, 2016, now Pat. No. 9,978,169, which is a continuation of application No. 13/569,947, filed on Aug. 8, 2012, now Pat. No. 9,251,617, which is a continuation of application No. 11/361,748, filed on Feb. 24, 2006, now Pat. No. 8,243,078.

(60) Provisional application No. 60/657,269, filed on Feb. 28, 2005.

(51) Int. Cl.
*G06T 13/40* (2011.01)
(52) U.S. Cl.
CPC .................................... *G06T 13/40* (2013.01)
(58) Field of Classification Search
CPC ..... G06T 13/80; G06T 2210/44; G06T 11/00; G06T 15/00; G06T 13/40
See application file for complete search history.

(56) References Cited

U.S. PATENT DOCUMENTS

| | | | | |
|---|---|---|---|---|
| 6,005,589 A | * | 12/1999 | Unuma | G06T 13/40 345/473 |
| 6,545,682 B1 | * | 4/2003 | Ventrella | G06F 3/011 345/473 |
| 6,646,643 B2 | * | 11/2003 | Templeman | G06F 3/011 345/473 |
| 6,738,065 B1 | * | 5/2004 | Even-Zohar | G06Q 30/06 345/473 |

OTHER PUBLICATIONS

Musse et al., Guiding and Interacting with Virtual Crowds in Real-Time, 1999, 12 pages, downloaded from https://infoscience.epfl.ch/record/101403/files/Musse_Garat_Thalmann_CAS_99.pdf on Jun. 6, 2019. (Year: 1999).*

* cited by examiner

*Primary Examiner* — Haixia Du
(74) *Attorney, Agent, or Firm* — Ansel M. Schwartz

(57) ABSTRACT

A method for creating a computer simulation of a crowd by animating a plurality of virtual actors simultaneously with each virtual actor set to a different setting of parameters and therefore expressing a unique individual body posture. An apparatus for creating a computer simulation of an actor by depicting the actor based on a plurality of postural parameters of the actor. A method for creating a computer simulation of an actor by having the actor move subject to a first idiomatic behavior for a first set of a plurality of successive key frames, and transitioning the actor to move to a second idiomatic behavior for a second set of a plurality of successive key frames.

3 Claims, 9 Drawing Sheets

INPUTS AND OUTPUTS

INPUTS AND OUTPUTS

SAW FUNCTION

VARIATION IN STANCE

TWO LINK INVERSE KINEMATICS

CROUCH BACKWARDS, TURN SIDEWAYS

DESCENDING STEPS

SHIFTING PHASE FOR STAIRS

TRANSITION TO/FROM BROAD JUMP

VARYING SKELETON

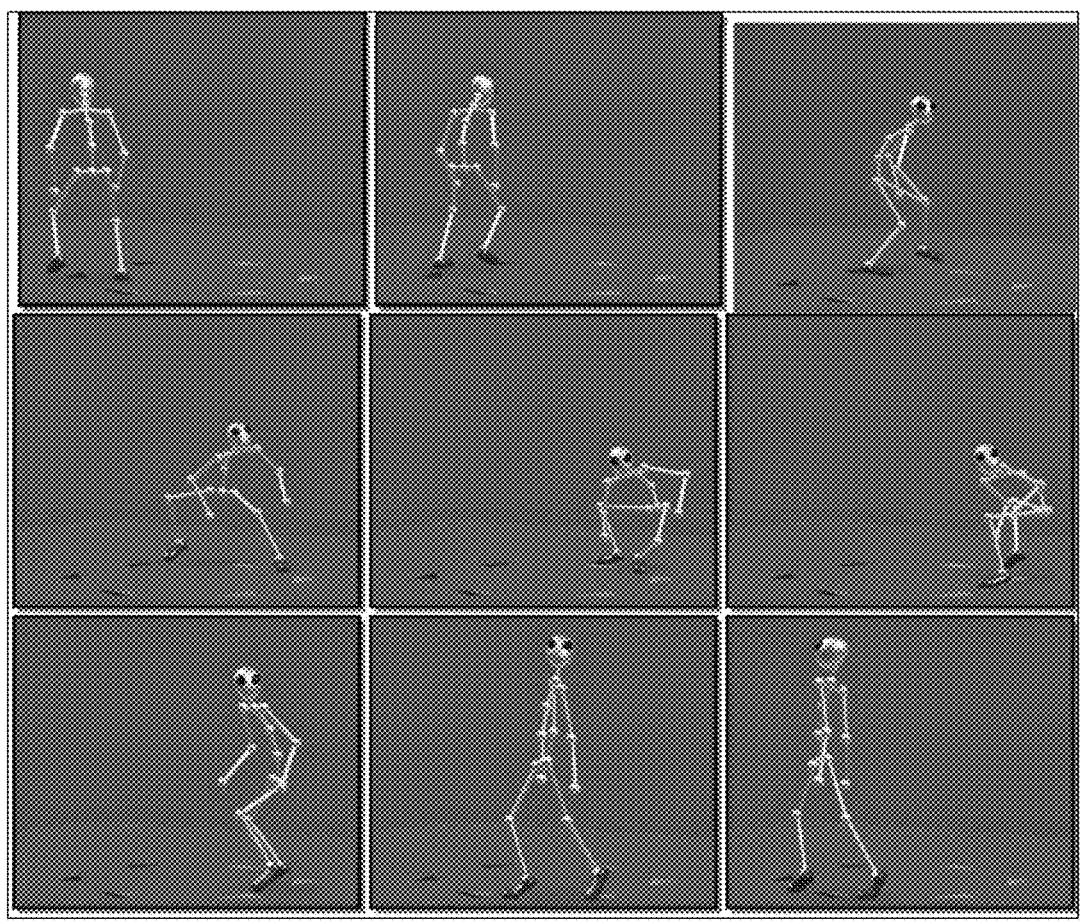
SHUFFLING TO GOLLUM TO SULTRINESS
FIG. 9
TWO APPLICATION MODES
LINEAR ANIMATION
(FIXED SET OF KEY FRAMES)
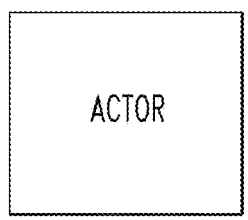
INTERACTIVE SIMULATION
(DYNAMIC KEY FRAMES)
FIG. 10

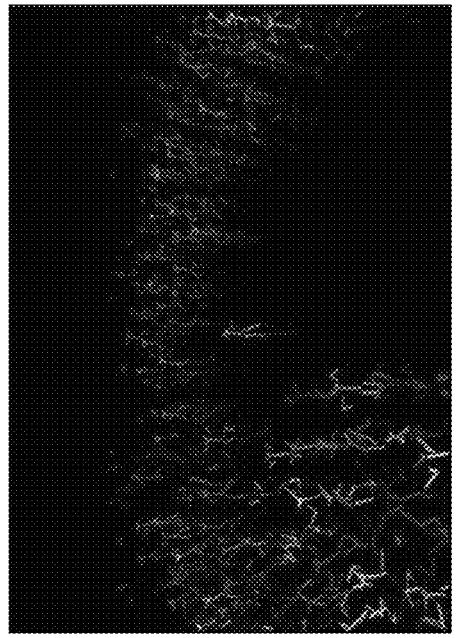
FIG. 11A CAMERS FLY-THROUGH AND FEATURED DANCER
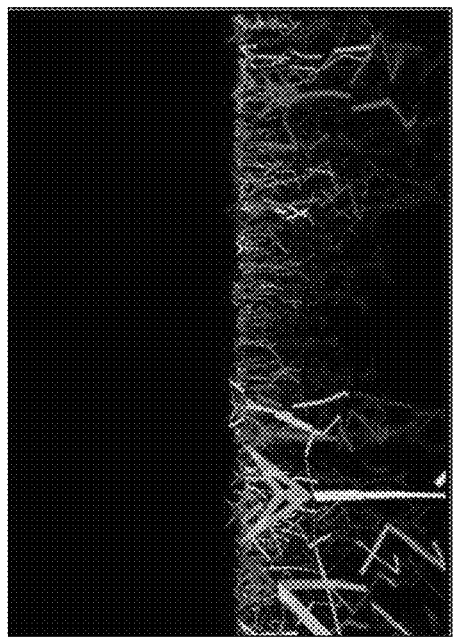
FIG. 11B CAMERS FLY-THROUGH AND FEATURED DANCER

A.I. AGENTS AND CORRESPONDING ACTORS

A.I. AGENTS AND CORRESPONDING ACTORS

METHOD AND APPARATUS FOR CREATING A COMPUTER SIMULATION OF AN ACTOR

CROSS-REFERENCE TO RELATED APPLICATIONS

This is a continuation of U.S. patent application Ser. No. 15/009,424 filed Jan. 28, 2016, now U.S. Pat. No. 9,978,169, which is a continuation of U.S. patent application Ser. No. 13/569,947 filed on Aug. 8, 2012, now U.S. Pat. No. 9,251,617 issued Feb. 2, 2016, which is a continuation of U.S. patent application Ser. No. 11/361,748 filed Feb. 24, 2006, now U.S. Pat. No. 8,243,078 issued Aug. 14, 2012, which claims priority from U.S. provisional patent application Ser. No. 60/657,269 filed Feb. 28, 2005, all of which are incorporated by reference herein.

FIELD OF THE INVENTION

The present invention is related to creating a computer simulation of an actor. More specifically, the present invention is related to creating a computer simulation of an actor which computes joint values by evaluating a plurality of modules which compute positions and orientations for feet and ankles, hands reaching/grasping, pelvis and spine and neck, hands swinging, legs and arms, and head gaze of the actor to accommodate dependencies between computations for different parts of the actor.

BACKGROUND OF THE INVENTION

The first computer graphic system to do 3D keyframe based human joint animation was a pure kinematic system introduced by [STERN, G., 1978. Garlands animation system (gas) a system for computer-aided keyframe animation. Doctoral Thesis, incorporated by reference herein], in which hand-made static poses were interpolated by smooth splines. Since then, there has been much work on automating the computer simulation of 3D walking characters. This work has variously focused on kinematics and dynamics.

The first high level parameterized kinematic based automation of walking was done by [ZELTZER, D., 1982. Motor Control Techniques for Figure Animation. IEEE Computer Graphics and Applications, 2(9):53-59, incorporated by reference herein]. Hierarchical concurrent state machines were used to control the gait of a synthetic skeleton. A pre-defined key posture was associated with each FSM state. Transitions between states produced linear interpolations between key-postures, producing joint angles that drove the animation.

Bruderlin and Calvert [BRUDERLIN, A., and CALVERT, T., 1989. Goal-directed, dynamic animation of human walking, In Computer Graphics (Proceedings of ACM SIGGRAPH 89), 23, 4, ACM, incorporated by reference herein] achieved non-slip foot placement by making the contact foot the root of the kinematic chain, and treating it as an inverted pendulum. They later combined this approach with parameterizable styles of walking [BRUDERLIN, A., and CALVERT, T., 1993. Interactive Animation of Personalized Human Locomotion. In Proc. of Graphics Interface 93, pages 17-23, incorporated by reference herein].

Boulic [BOULIC R., MAGNETAT-THALMANN, N., and MAGNETAT-THALMANN, D., 1990. A global human walking model with real-time kinematic personification. Visual Computer, 6(6):344-358, incorporated by reference herein] used forward kinematics followed by an inverse kinematics post-processing step to modify foot position when feet penetrated the ground, and then later modified this approach to maintain proper balance centering of the body over the feet [BOULIC, R., MAS, R., and MAGNETAT-THALMANN, D., 1996. A robust approach for the center of mass position control with inverse kinetics. Journal of Computer and Graphics, 20(5), incorporated by reference herein].

Ko and Badler [KO, H. and BADLER, N., 1996. Animating Human Locomotion in Real-time using Inverse Dynamics, Balance and Comfort Control. IEEE Computer Graphics and Applications, 16(2):50-59, incorporated by reference herein] did post-processing inverse dynamics on kinematic walking, adjusting the results of forward kinematics to ensure that movement embodied appropriate forces. Spacetime constraints on the body center were introduced by Witkin [WITKIN, A. and KASS, M., 1988. In Computer Graphics (Proceedings of ACM SIGGRAPH 88), 22, 4, ACM, incorporated by reference herein] to compute these correcting dynamics, specified as the minimization of a cost function, over the entire course of an animation, rather than sequentially in time. Cohen [COHEN, M., 1992. Interactive spacetime control for animation. In Computer Graphics (Proceedings of ACM SIGGRAPH 92), 26, 4, ACM, 293-302, incorporated by reference herein] refined this approach to allow space-time windows to be specified, so that these dynamic adjustments could be applied interactively. Gleicher [GLEICHER, M., 1997. Motion editing with spacetime constraints. In Proc. of Symposium on Interactive 3D Graphics, incorporated by reference herein] extended space-time constraints to the handling of constraints on all kinematic trajectories of the walking figure.

SUMMARY OF THE INVENTION

The present invention pertains to a method for creating a computer simulation of an actor having a first foot, a second foot and a body. The method comprises the steps of planting the first foot as a support foot along a space time-varying path. There is the step of stopping time regarding placement of the first foot. There is the step of changing posture of the first foot while the first foot is planted. There is the step of moving time into the future for the second foot as a lifted foot and changing posture for the lifted foot.

The present invention pertains to an apparatus for creating a computer simulation of an actor having a first foot, a second foot and a body. The apparatus comprises a computer. The apparatus comprises a software program that performs the steps of planting the first foot as a support foot along a space time-varying path. There is the step of stopping time regarding placement of the first foot. There is the step of changing posture of the first foot while the first foot is planted. There is the step of moving time into the future for the second foot as a lifted foot and changing posture for the lifted foot.

The present invention pertains to a software program for creating a computer simulation of an actor having a first foot, a second foot and a body that performs the steps of planting the first foot as a support foot along a space time-varying path. There is the step of stopping time regarding placement of the first foot. There is the step of changing posture of the first foot while the first foot is planted. There is the step of moving time into the future for the second foot as a lifted foot and changing posture for the lifted foot.

BRIEF DESCRIPTION OF THE DRAWINGS

In the accompanying drawings, the preferred embodiment of the invention and preferred methods of practicing the invention are illustrated in which:

FIG. 9 shows shuffling to Gollum to Sultriness.

FIG. 10 shows two application modes.

FIGS. 11a and 11b show camera fly-through and featured dancer.

DETAILED DESCRIPTION

Figure 3:
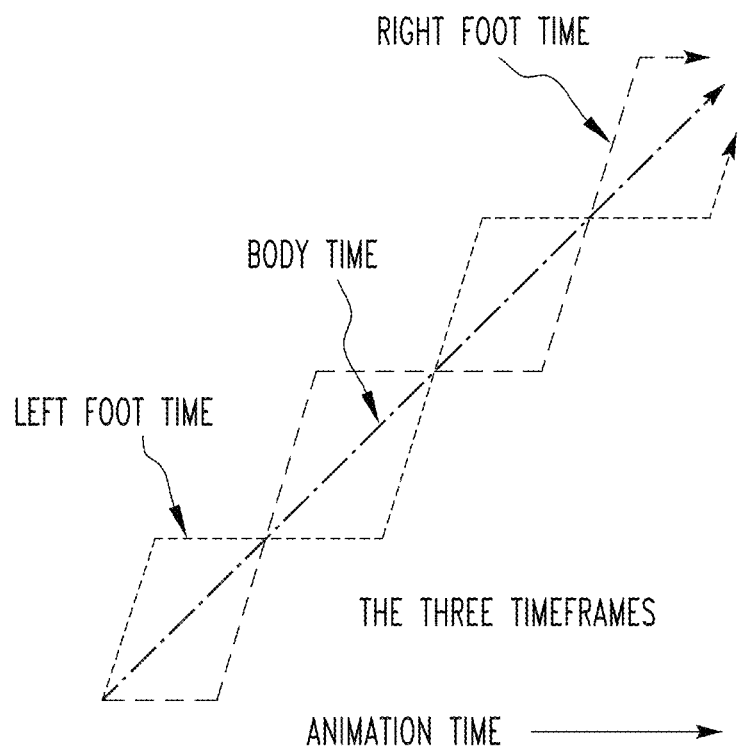
FIG. 3 shows the three time frames.
Figure 3A:
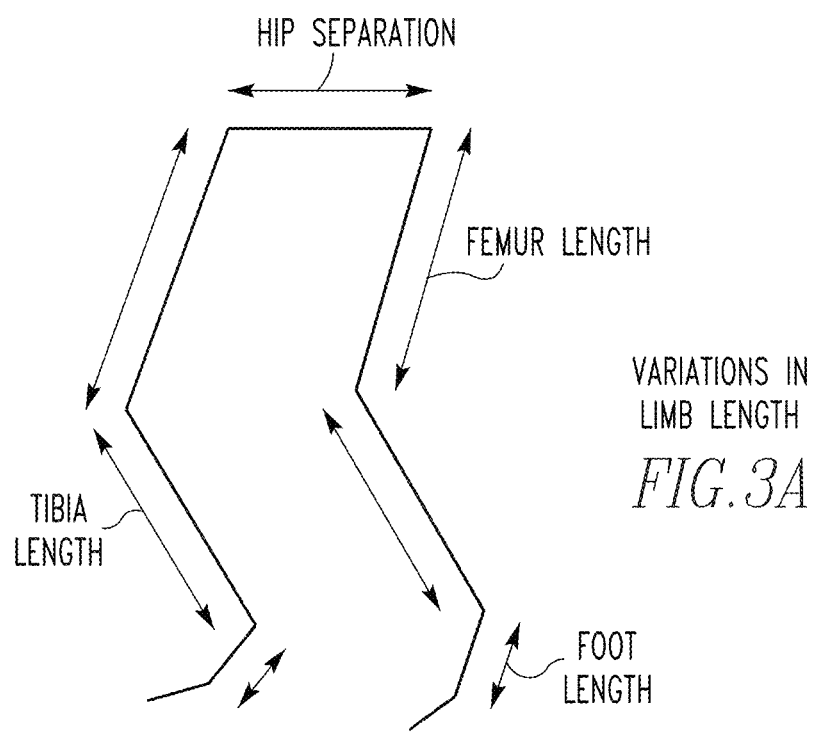
FIG. 3a shows variations in limb length.
Figure 3B:
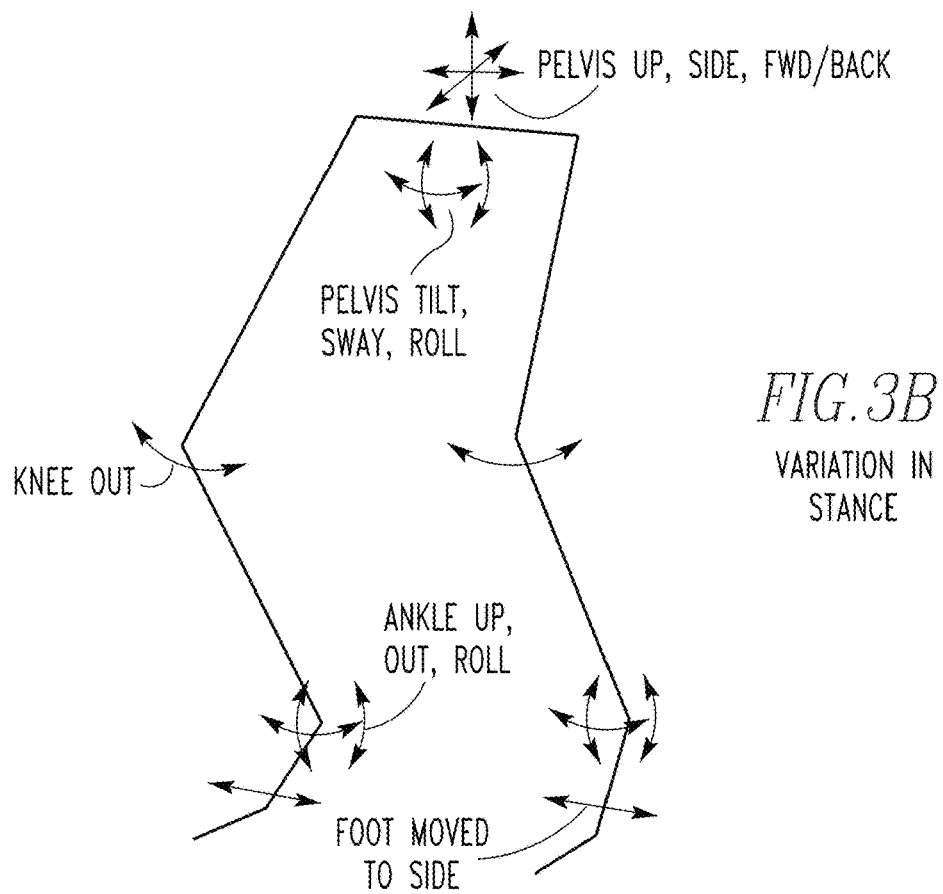
FIG. 3b shows variations in stance.
Figure 3C:
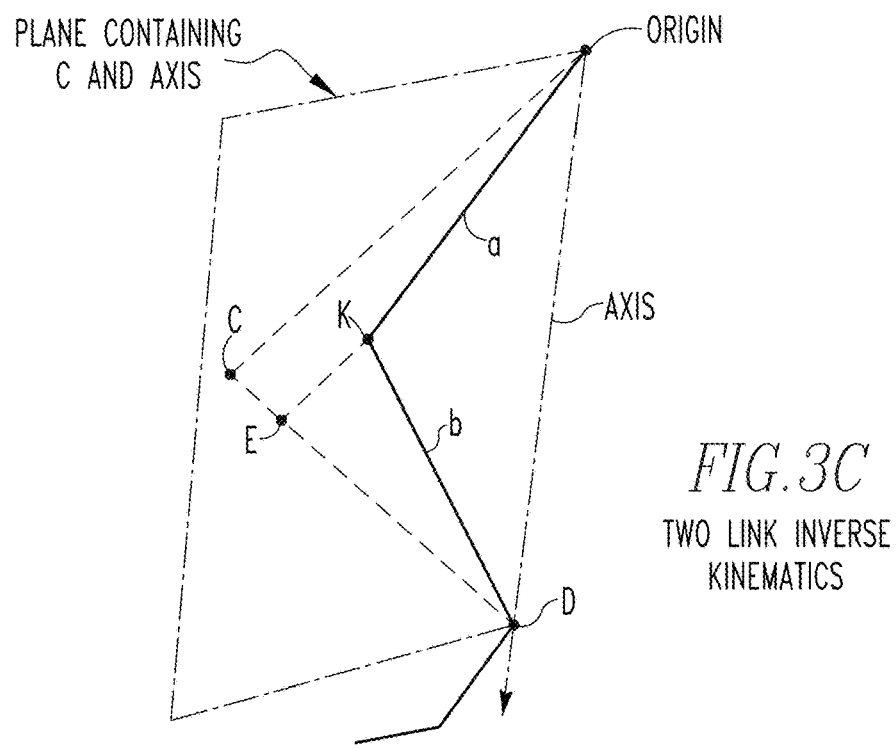
FIG. 3c shows two link inverse kinematics.

Referring now to the drawings wherein like reference numerals refer to similar or identical parts throughout the several views, and more specifically to FIGS. 3a, 3b and 3c thereof, there is shown a method for creating a computer simulation of an actor having a first foot, a second foot and a body. The method comprises the steps of planting the first foot as a support foot along a space time-varying path. There is the step of stopping time regarding placement of the first foot. There is the step of changing posture of the first foot while the first foot is planted. There is the step of moving time into the future for the second foot as a lifted foot and changing posture for the lifted foot.

Preferably, there is the step of alternating the first and second feet over a walk cycle having a first half and a second half, so that the lifted second foot switches roles with the planted first foot and the planted first foot switches roles with the lifted second foot of the first half during the second half of each walk cycle. There is preferably the step of creating emotionally expressive postures for the body. Preferably, the space-time path is a function of parameters which contain values for a rude positioned X, Y, of the actor, and values for a plurality of postural parameters of the actor.

The postural parameters preferably include how far apart the actor's feet are, the degree of bending of the actor's knees, how far back the actor's shoulders are, and how much the actor's hips are swaying from side to side when the actor is walking.

Preferably, the space-time path is implemented as a set of key frames at discrete values of time. Preferably, there is the step of converting path values to joint values. The converting step preferably includes the step of examining key frames along the path that influence values within a window of time that contains one walking length of the actor.

Preferably, there is the step of computing joint values by evaluating a plurality of modules which compute positions and orientations for feet and ankles, hands reaching/grasping, pelvis and spine and neck, hands swinging, legs and arms, and head gaze of the actor to accommodate dependencies between computations for different parts of the actor.

The present invention pertains to an apparatus for creating a computer simulation of an actor having a first foot, a second foot and a body. The apparatus comprises a computer. The apparatus comprises a software program that performs the steps of planting the first foot as a support foot along a space time-varying path. There is the step of stopping time regarding placement of the first foot. There is the step of changing posture of the first foot while the first foot is planted. There is the step of moving time into the future for the second foot as a lifted foot and changing posture for the lifted foot.

Preferably, there is the step of alternating the first and second feet over a walk cycle having a first half and a second half, so that the lifted second foot switches roles with the planted first foot and the planted first foot switches roles with the lifted second foot of the first half during the second half of each walk cycle. There is preferably the step of creating emotionally expressive postures for the body. Preferably, the space-time path is a function of parameters which contain values for a rude positioned X, Y, of the actor, and values for a plurality of postural parameters of the actor.

The postural parameters preferably include how far apart the actor's feet are, the degree of bending of the actor's knees, how far back the actor's shoulders are, and how much the actor's hips are swaying from side to side when the actor is walking.

Preferably, the space-time path is implemented as a set of key frames at discrete values of time. Preferably, there is the step of converting path values to joint values. The converting step preferably includes the step of examining key frames along the path that influence values within a window of time that contains one walking length of the actor.

Preferably, there is the step of computing joint values by evaluating a plurality of modules which compute positions and orientations for feet and ankles, hands reaching/grasping, pelvis and spine and neck, hands swinging, legs and arms, and head gaze of the actor to accommodate dependencies between computations for different parts of the actor.

The present invention pertains to a software program for creating a computer simulation of an actor having a first foot, a second foot and a body that performs the steps of planting the first foot as a support foot along a space time-varying path. There is the step of stopping time regarding placement of the first foot. There is the step of changing posture of the first foot while the first foot is planted. There is the step of moving time into the future for the second foot as a lifted foot and changing posture for the lifted foot.

Preferably, there is the step of alternating the first and second feet over a walk cycle having a first half and a second half, so that the lifted second foot switches roles with the planted first foot and the planted first foot switches roles with the lifted second foot of the first half during the second half of each walk cycle. There is preferably the step of creating emotionally expressive postures for the body. Preferably, the space-time path is a function of parameters which contain values for a rude positioned X, Y, of the actor, and values for a plurality of postural parameters of the actor.

The postural parameters preferably include how far apart the actor's feet are, the degree of bending of the actor's knees, how far back the actor's shoulders are, and how much the actor's hips are swaying from side to side when the actor is walking.

Preferably, the space-time path is implemented as a set of key frames at discrete values of time. Preferably, there is the step of converting path values to joint values. The converting step preferably includes the step of examining key frames along the path that influence values within a window of time that contains one walking length of the actor.

Preferably, there is the step of computing joint values by evaluating a plurality of modules which compute positions and orientations for feet and ankles, hands reaching/grasping, pelvis and spine and neck, hands swinging, legs and arms, and head gaze of the actor to accommodate dependencies between computations for different parts of the actor.

In the operation of the invention, when creating complex software simulations or computer games, it is useful to incorporate virtual actors that simulate the appearance of human behavior while moving within the simulated environments. It can be difficult to reconcile proper foot placement with the full range of body postures needed to convey emotion and attitude, without compromising quality of movement. Both posture and foot placement should ideally anticipate the higher level goals and intentions of the actor, and should vary according to what the actor's goals are at higher cognitive levels.

The current invention recasts the movement of these virtual actors as a function of a path of values through time (rather than simply through space). This allows an approximate simultaneous solution to be constructed to the problems of (1) choosing good foot placement and (2) creating emotionally expressive body postures, in a way that simplifies and unifies these two sub-problems.

The key insight is to look at all body parameters along this time-varying path, and then to consider the actors support foot and lifted foot as though they are traveling along the same time-varying path as the rest of the body, only at variable rates. For the supporting foot planted on the ground, time stops and posture is frozen. For the lifted foot, time accelerates into the future and posture changes rapidly.

Such a framework allows all aspects of body posture to be controlled by efficiently computed algorithmic procedures which can be evaluated at a single point in time, in much the way that "procedural shaders" used for procedural texture synthesis can be evaluated at a single point in space [PERLIN, K., 1985. An Image Synthesizer, In Computer Graphics (Proceedings of ACM SIGGRAPH 85), 19, 4, ACM, incorporated by reference herein].

The result is not biomechanically perfect, but it is extraordinarily fast and flexible. This mechanism provides a framework in which programmers can create algorithmic mechanisms for the control of virtual actors which enable artists to exert very fine control over character attitude and emotion via the use of simple and intuitive parameters. Hundreds of actors can be interactively directed in real-time on consumer level hardware, with each displaying emotively convincing body language and proper foot placement. These actors can be made to precisely follow arbitrary paths, including uneven terrain and stairs, with equal facility in all walk styles.

Even when virtual actors possessing a higher degree of biophysical accuracy are required, virtual actors constructed using this mechanism can serve as a highly controllable and expressive instrument to create approximate solutions that feed into more computationally heavy constraint optimization and energy minimization techniques.

The computational framework of the present technique is based on space-time paths. Let space-time path P(time) V be a function that maps time to a vector of parameter values V. In practice, V will contain values for the root position x, y, and z of the actor, as well as values for a plurality of postural parameters.

Typical examples of such parameters are: how far apart the feet are, the degree of bending at the knees, how far back the shoulders are set, how much the hips sway from side to side when walking.

Figure 1:
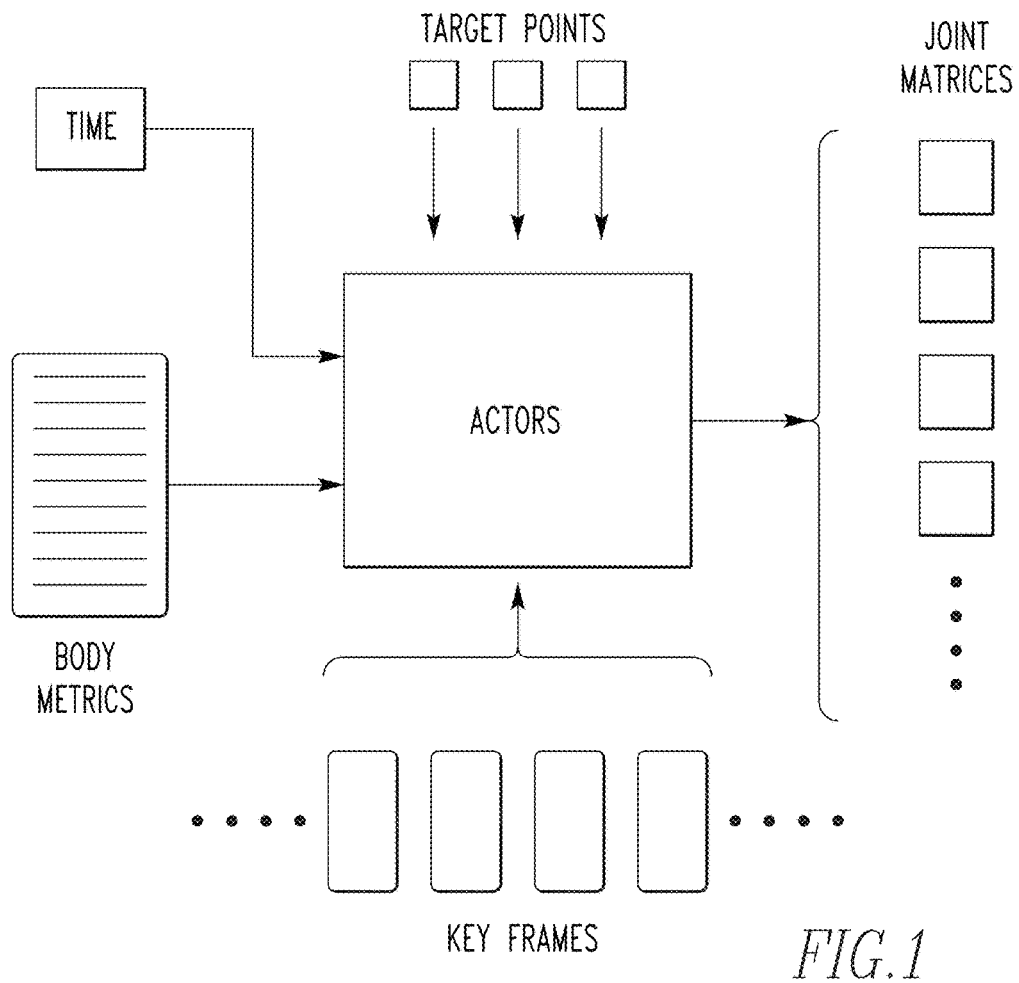
FIG. 1 is a block diagram of the inputs and outputs with respect to the present invention.

A function ACTOR(P,M,T,time)->J is defined which takes as input:
(1) a space-time path P;
(2) a set of constant body metrics M, which includes such body measurements as forearm length, thigh length and torso length;
(3) a set of target points T in the environment, which includes the gaze fixation point and the positions of objects to be grasped by the virtual actor;
(4) a value for time;
and produces as its output a set of joint matrices J (FIG. 1).

In practice, the space-time path P(time) is implemented as a set of key-frames at discrete values of time. The values at other intermediate points in time are interpolated by continuous interpolant such as piece-wise cubic splines or piece-wise linear functions.

The virtual actor converts path values to joint values. To do this at any given time, the actor needs to examine keyframes along the path that influence values within the window of time that contains one walking stride length.

For a human figure, the actor function computes joint values by evaluating the following six modules in the indicated order, to accommodate dependencies between computations for different parts of the simulated human body:
1. Feet+Ankles
2. Hands reaching/grasping
3. Pelvis+Spine+Neck
4. Hands swinging
5. Legs+Arms
6. Head Gaze Note that the hands are visited in two different modules. Reaching and grasping are computed before the pelvis and spine, whereas hand position for arm swinging is computed after the pelvis and spine.

In order for the body to be emotionally expressive, the spine needs to be sufficiently flexible. In one embodiment the spine is represented by the five joints corresponding to the fifth and first lumbar vertebrae (the lower back), the sixth thoracic vertebrae (the chest cage) and the fifth and first cervical vertebrae (the base and top of the neck).

After the pelvis, torso and feet positions have been computed, the pelvis is connected to the feet, and the torso is connected to the hands, via a simple closed-form two-link inverse kinematics computation which positions the knees and elbows. Both knee and elbow turn-out angles default to values that appear natural. Deviations from these values are then parametrically adjustable by the artist.

Figure 2:
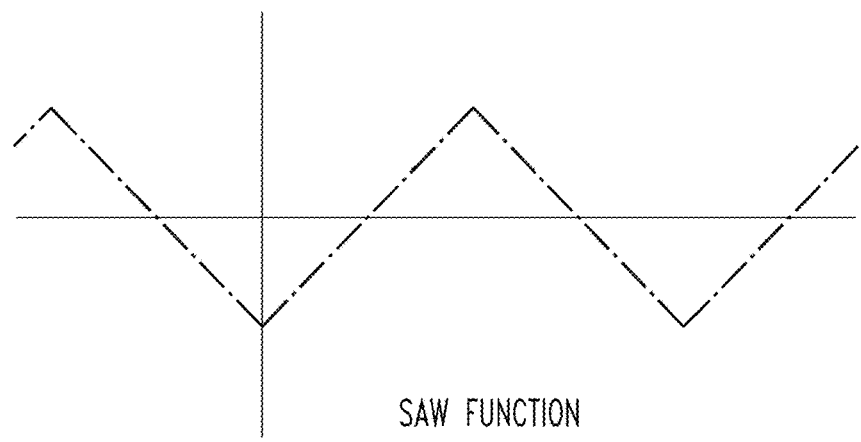
FIG. 2 is a graph of a saw function.

All of the modules receive a value of time as their input except for the module that computes the foot positions and ankle joints. The left foot is given an altered time input value of:

time+saw(time/pace)

whereas the right foot is given an altered time input value of:

time+saw(time/pace+½)

where pace is in units of walk cycles per second, and saw(t) is defined by:

saw($t$)=if ($t$ mod 1)<½ then ($t$ mod 1)−¼ else ¾−(1 mod 1)(FIG. 2)

The effect of this time displacement is to jog time back and forth in the course of a single walk cycle. In the first half of the walk cycle the left foot travels forward in time one full cycle, while the right foot remains fixed at the start of the cycle. In the second half of the walk cycle, the right foot travels forward in time one full cycle, while the left foot remains fixed at the end of the cycle, as in FIG. 3.

The one exception to the above is the continuous heel-to-toe foot roll of the support foot while that foot is in contact with the floor. Even though the values of all body parameters are fixed in time while the support foot is in contact with the floor (because time is not changing while the foot is in contact with the floor), the mechanism nonetheless continues the rotation of the foot that produces the rolling floor contact for first the heel, then the ball of the foot, and finally the toe. The bending at the metatarsal during the last stages of floor contact is handled as a simple kinematic constraint: the front part of the foot is bent a sufficient angle so that it will not penetrate the floor. When the virtual actor is walking backwards, proceed similarly, but reverse the direction of roll: the toe contacts the floor first, and then the foot rolls onto the heel.

Because the entire mechanism is a function of (1) fixed body metrics, (2) the space-time path, and (3) target points T, any given collection of values for these will produce a unique and well defined set of values for the collection of joints J at a given time.

This mechanism confers several desirable properties on the resulting animation. Because reasonable foot placement is guaranteed, the programmer working within this framework to create parametric controls for artists is free to implement any desired mechanism for control of body posture. The artist using such mechanisms can blend expressive movements in a preferred parameter space, through the use of parametric controls which are intuitive and easy to work with.

For a walking biped, the placement of the skeletal limbs from the pelvis on down (the pelvis, upper legs, lower legs, and foot parts) are inter-related. The described temporal phase-shift mechanism makes it easier to place the pelvis and the parts below it in a way that is coordinated and appears natural.

In this section, the degrees of freedom of these lower body parts are enumerated, and the mechanisms to place them are described.

All of the body parts of a walking biped from the pelvis downward are involved in foot placement. The actual positions are of the body parts are dependent upon three types of numerical quantity:

Limb lengths
Parameters controlling stance
Parameters varying position during the walk cycle Of the above, limb lengths are generally unchanging throughout time. The standard limb lengths that influence the placement of body parts of a biped from the pelvis down are shown in FIG. 3a.

Parameters controlling stance and parameters varying position during the walk cycle influence the same degrees of freedom. The only difference is that the latter cause rhythmic changes to these degrees of freedom over the cause of each successive walk cycles. The degrees of freedom which are influenced are shown in FIG. 3b.

In one embodiment, the placement of the two feet at a known time for a bipedal virtual actor walking at a constant speed and a known pace (as measured in cycles per second), along a straight line path with a known foot lift can be described as follows:

Walk Cycle:

offset=if left_foot then 0.0 else 0.5 phase=time/pace+offset foot_forward=speed×saw(phase)

foot_lifted=lift×max(0,sin(2πp phase))

In other embodiments, the sin( ) function, which serves as a periodic time-varying control of elevation of each foot above the ground, can be replaced with a different periodic function.

The degrees of freedom which can vary positioning of lower body parts in walking at a constant rate along a straight-line path can be enumerated as follows. For some of these degrees of freedom, such as the amount that a foot turns inward or outward, it is reasonable to assign positive and negative values (i.e.: range=−1 . . . 1). For others, such as the amount that the feet lift off of the floor when walking, it is only reasonable to assign positive values (i.e.: range= 0 . . . 1).

| parameter | range |
|---|---|
| Limb lengths: | |
| Hip width | 0...1 |
| L femur length | 0...1 |
| R femur length | 0...1 |
| L tibia length | 0...1 |
| R tibia length | 0...1 |
| L foot length | 0...1 |
| R foot length | 0...1 |
| Pelvis movement: | |
| Up (i.e.: knees straight) | 0...1 |
| Lean to side | −1...1 |
| Thrust back or forward | −1...1 |
| Tilt back or forward | −1...1 |
| Turn left or right | −1...1 |
| Roll left or right | −1...1 |
| Leg placement: | |
| L knee turn out | −1...1 |
| R knee turn out | −1...1 |
| Foot placement: | |
| L ankle turn out | −1...1 |
| R ankle turn out | −1...1 |
| R ankle roll to side | −1...1 |
| R ankle roll to side | −1...1 |
| L ankle tilt heel to toe | −1...1 |
| R ankle tilt heel to toe | −1...1 |
| L foot move to side | 0...1 |
| L foot move to side | 0...1 |
| Other: | |
| Hop on one foot | −1...1 |
| Pace of walk | 0...1 |
| Foot lift for walk | 0...1 |
| Sidling walk | −1...1 |

Because the position of the top of the femur and the position of the bottom of the tibia are completely determined by parameters controlling the position of the hips and ankles, there is only one additional degree of freedom per leg in the stance of the biped: the degree of knee turn out, as shown above.

All of the above pose variations are described with respect to the root coordinate frame of the walking virtual actor. This coordinate frame is itself moving in a straight line so that the virtual actor appears to travel forward.

The six degrees of pelvis variation consist of three degrees of translational freedom and three degrees of rotational freedom. These can all be described by a single affine transformation, which can be expressed as a 4×4 transformation matrix.

The position and orientation of each ankle for a biped walking at a constant speed along a straight line are completely determined by the three parameters that control its time-varying position: foot forward, foot lifted and foot move_to_side, and the three parameters that control the ankle orientation: turn out, roll to side and tilt to tiptoe. Given these values, the position and orientation of each foot can be expressed by a 4×4 transformation matrix.

Once the position and orientation of pelvis, left foot and right foot are determined, there is only one remaining degree of freedom left for placing each leg: the degree of rotational turn-out at the knee. These can be specified by time-varying parameters Left knee turn-out and Right knee turn-out. Given the value of knee turn-out, each leg can be rigidly positioned as a simple closed-form solution to the two-link inverse kinematics chain of hip→? knee→? ankle, as follows:

Given a hip located at the origin, respective femur and tibia lengths a and b, and an ankle located at point D, there is only one remaining degree of freedom: the rotation of the knee position around the axis that runs from the origin through D. This rotation can be specified by specifying some point C that lies in plane that contains both the knee and this axis. Given a, b, C and D, knee position K can be computed as follows (FIG. 3c):

$$x = \frac{1}{2} + \frac{1}{2}(a^2 - b^2)/(C \cdot C)$$

$$E = D - C(C \cdot D)/(C \cdot C)$$

$$K = Cx + E\sqrt{\max(0, a^2 - (C \cdot C)x^2)/E \cdot E}$$

Walking Along Arbitrary Space-Time Paths with No Foot-Slip

The above section describes how to place the pelvis, knees and feet as a bipedal virtual actor walks along a straight line path at a constant rate, with all parameters fixed to a constant value. If the path were to change to a curved path, or the rate of forward movement were to vary through time, or if there is any variation through time of the parameters which control limb length, stance or changing position throughout the walk cycle, then the support feet would appear to slip on the floor, thereby destroying the visual illusion that the virtual actor's support foot is properly affixed to the floor for that portion of the walk cycle during which the support foot carries the weight of the virtual actor.

If all controlling parameters are described within a space-time path as described earlier, and if the novel mechanism is used of employing temporal variation along this path, also described earlier, then the support foot does not slip on the floor, but rather stays in a consistent position with respect to the world, until the foot is lifted. While on the ground, the support foot linearly transitions from being half a cycle in the future to being half a cycle in the past, with respect to the pelvis of the virtual actor.

In addition, the lifted foot automatically moves along a path that appears to show the higher level cognitive intentionality of the virtual actor, because this lifted foot literally moves into the future (i.e.: forward in time along the space-time path), thereby anticipating the virtual actor's intentions as expressed in time-varying values for actor location, stance and changing position throughout the walk cycle. As the animation progresses, and this lifted foot thereby descends and becomes the next support foot, the foot is placed in a position and orientation which is consistent with the movements of the virtual actor for the next half cycle. While in the air, the lifted foot linearly transitions from being half a cycle in the past to being half a cycle in the future, with respect to the pelvis of the virtual actor.

An Example

Figure 4:
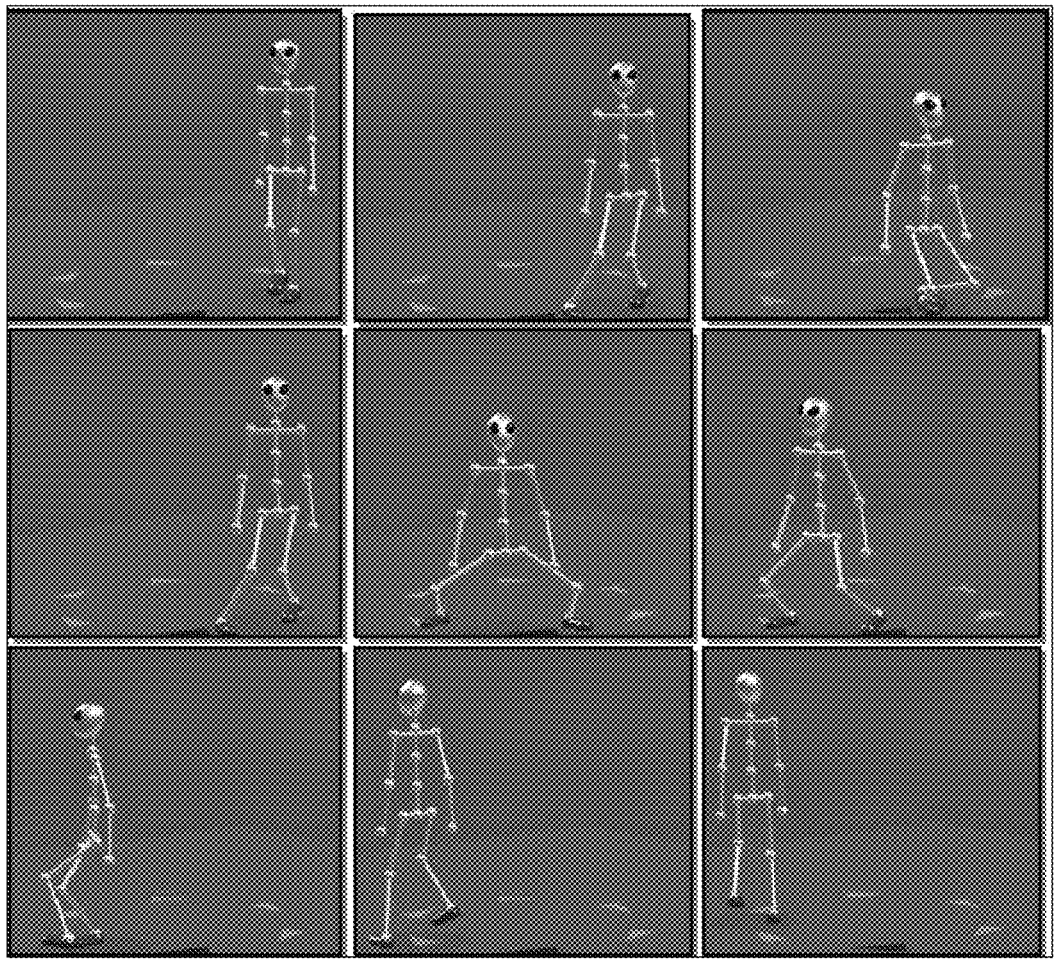
FIG. 4 shows a crouch backwards, turn sideways.

In the sequence shown in FIG. 4, a walking virtual actor has been directed first to crouch backwards, and then to turn sideways with feet spread, before continuing on his way. To create this behavior, the artist simply specifies a keyframe (corresponding to the fourth image of FIG. 4) in which the actors pelvis should be lowered and rotated by 180, and then a keyframe (corresponding to the eighth image of FIG. 4) in which the actors feet should be spread and the pelvis rotated 90. In the course of executing this transition, the actor produces a trajectory for the feet and for all body joints (seen in images two and three, and images five through seven) that results in reasonable foot placement and no foot sliding. This will be true for any walking pace and for all settings of other body parameter values.

Uneven Terrain and Walking Up and Down Stairs

Reasonable foot placement when walking along uneven terrain is automatically guaranteed by the periodic temporal displacement applied to the feet that has been described above. Since the pelvis and the two feet exist in three different time frames, within its own respective time frame, each of these three body parts simply maintains the proper vertical distance above whatever is the current terrain height for that respective part at that moment in time. The result is a walk in which the pelvis maintains a proper distance from the ground, and the feet land at ground level of the varying terrain at each footfall. As in [ROSE, C. COHEN, M, and BODENHEIMER, B., 1998. Verbs and Adverbs: Multidimensional Motion Interpolation. IEEE Computer Graphics and Applications, 18(5):32-40, incorporated by reference herein], adverbial parameter settings to convey change in stance when climbing or descending are blended in. Rose refers to these blended in settings as "adverbs". This blending is described below in further detail. In contrast, walking up or down stairs requires some intervention, so that the actor will walk upon the stair steps, rather than upon the rises between steps, which are height discontinuities that separate successive stair steps.

Figure 5:
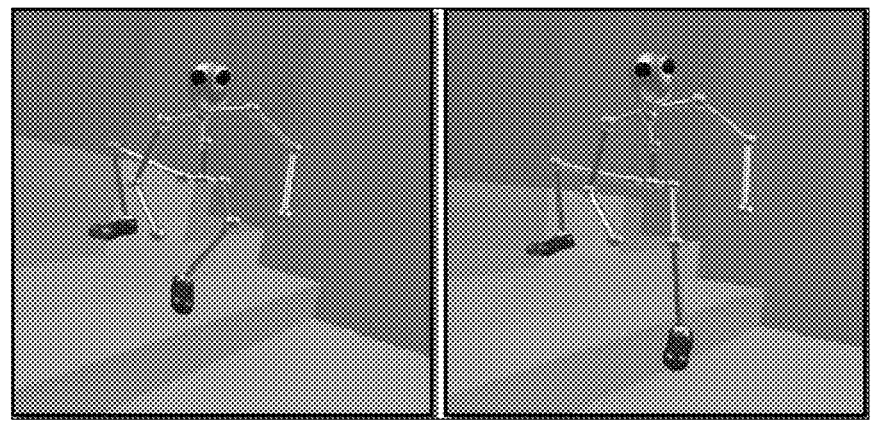
FIG. 5 shows descending steps.

In order to ensure that the virtual actor walks up and down steps properly, the basic algorithm is modified to allow the pace of the actor to vary, so that the actor's feet will land on the stair steps, rather than between them. In FIG. 5, the actor is portraying a slithering creature skulking down stairs. The height of the actors pelvis above the floor is computed by blurring the terrain height function (in this case, via a MIPmap [WILLIAMS, L., 1983. Pyramidal Parametrics. In Computer Graphics (Proceedings of ACM SIGGRAPH 83), 17, 4, ACM, incorporated by reference herein]). The higher the pelvis, the blurrier is the effective height function. This results in smooth movement of the pelvis over stair steps as well as over any other discontinuities in floor height.

The floor height at each foot is only evaluated at places where that foot touches down; that is, where the phase of the walk cycle is a multiple of 0.5 cycles.

Figure 6:
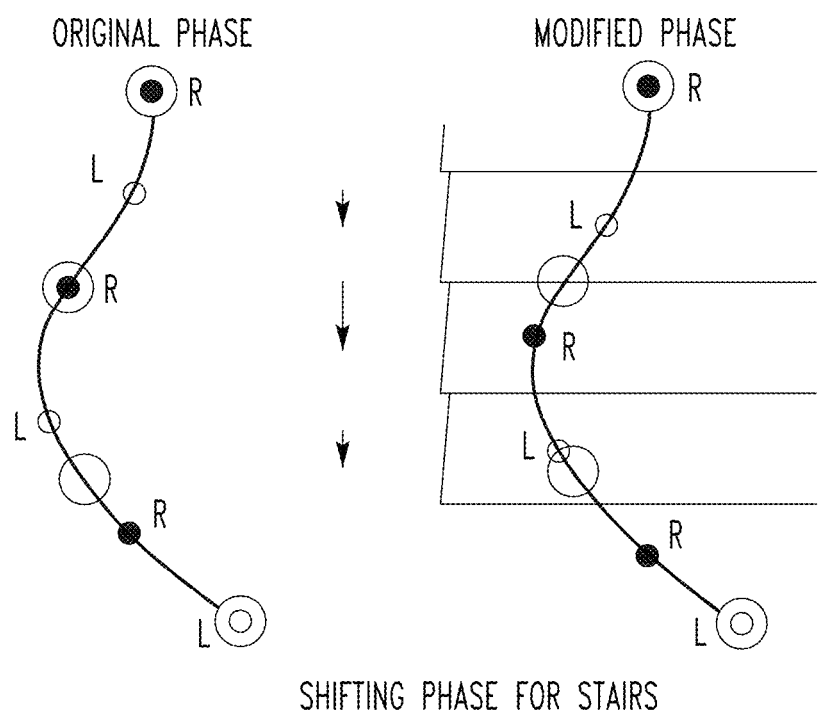
FIG. 6 shows shifting phase for stairs.

The actor's feet are guaranteed to land on the steps, not on the rises between steps, by shifting the phase slightly at the keyframes. In an approach similar to [CHUNG, S., and HAHN J., 1999. Animation of Human Walking in Virtual Environments. In Proc. Int. Conf. on Computer Animation, pages 4-15. IEEE, incorporated by reference herein], preparation is started for the step up or down two keyframes ahead. This gives enough time to smoothly and unobtrusively modify the footstep phase before the edge of a stair-step. The algorithm is illustrated in FIG. 6. The keyframes themselves (shown in the diagram as circular rings) are not moved, but the walk-cycle phase at each keyframe is adjusted slightly, so that each of the places where the left foot touches down (where phase is a multiple of 1.0 cycles), and where the right foot touches down (where phase is an odd multiple of 0.5 cycles) is shifted to the center of a stair step. This process is independent of style parameters: the actor can go up and down stairs equally well in any walking style.

In the context of producing a linear animation, it is important to be able to effect such phase shifts locally, without changing the phase of the walk cycle at all later points in the animation. In this way the animator can be sure that foot placement does not change unexpectedly in later scenes due to edits in earlier scenes. To this end, the phase shifting mechanism always takes care to localize any imposed phase shifts, such as those caused by negotiating stairs. In this way, the original walk cycle phase is restored after a small number of additional keyframes.

Staggered Gaits

Figure 7:
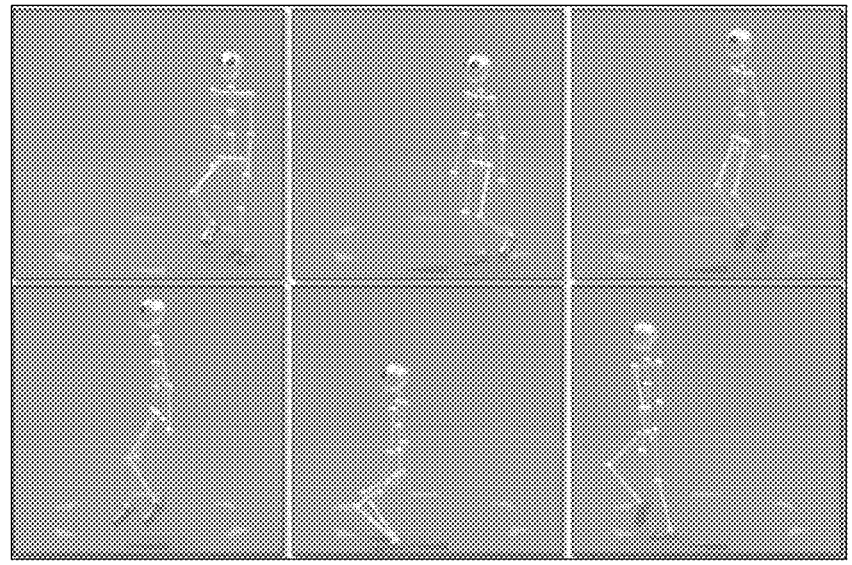
FIG. 7 shows transition to/from broadjump.

This approach to walking movement facilitates the creation of staggered walks or gaits, by providing control over the amount of temporal phase displacement between the two feet. For example, a character can transition from a walk to a broadjump by changing the temporal phase difference between the two feet (normally half a cycle) gradually to zero. FIG. 7 shows a transition first into, and then out of, a broadjump. By setting the phase displacement to intermediate values, the actor can be made to perform staggered or skipping gaits.

Similarly, the appearance of heavy steps or light steps, as defined by the percentage of time that each foot remains in contact with the ground, can be modulated by sinusoidally modulating each foots temporal phase displacement throughout the period of the walk cycle. In this way, footsteps can be made heavy (more time spent in fixed support, as would be found if an actor were wearing lead shoes), or light (both feet off the ground simultaneously, as would occur while running).

Variation in Body Skeleton

Figure 8:
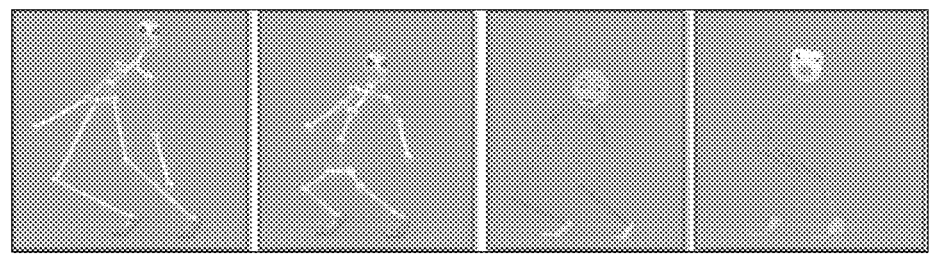
FIG. 8 shows a varying skeleton.

Because the behavior of the parameters which modulate body posture is not constrained by any special requirement to accommodate foot placement, it is easy and straightforward in practice to implement the algorithms that vary these parameters in a way that is insensitive to the lengths of the various limbs. A virtual actor can have very long or short legs, unequal lengths between the femur and tibia, long or short spine, or a very wide or narrow pelvis. The knees can just as easily bend backwards, which is useful for actors playing avian characters. Limb length can change in the middle of an animation, which can be useful in certain exaggerated cartoon contexts. This allows a result similar to the motion retargeting of [GLEICHER, M., 1998, Retargeting Motion to New Characters, In Proceedings of ACM SIGGRAPH 1998 ACM Press/ACM SIGGRAPH, New York. Computer Graphics Proceedings, Annual Conference Series, ACM, incorporated by reference herein], but at smaller computational cost. FIG. 8 shows several examples of highly divergent actors performing the same movement.

Integrating with Body Posture

The foot animation system is part of a larger framework. In this framework, animation shaders add attitude to the entire body posture and motion. The following descriptions of motion idioms and posture variation describe how the enabling mechanism benefits the construction of full body postures.

Motion Idioms

The integration of footstep placement and body posture adjustment simplifies the creation of parameters to vary body posture. This makes it much easier to construct body posture variation which is intuitive to an artist or animator who wishes to control the virtual actor.

The use of intuitive body attitude parameters facilitates the simple creation of "idioms"—combinations of static and rhythmic posture that create a characteristic higher level mood or attitude. For example, in the one embodiment a parameter is provided that sinusoidally varies the pelvis height at twice the frequency of the walk cycle, so that the pelvis rises each time a support foot strikes the ground. This creates a bouncy gait, which conveys an appearance of carefree walking motion. If this same parameter is set to a negative value, then the pelvis descends each time a support foot strikes the ground. This produces the appearance of a jaunty, bopping style of walk. In this latter case, the impression of bopping is greatly enhanced by making the footsteps heavy, as described above, so that the actor appears to be deliberately placing each footstep. A negative bounce together with a heavy step can be merged into a single combination "bop" parameter, in which these two degrees of freedom are varied together.

Similarly, it is straightforward to create parameter combinations that suggest such attitudes as fearful, sexy, careful, or slithering. Such combinations can be saved and then blended with various weights during the course of an animation or simulation, to suggest subtle momentary moods and attitudes. This is similar in spirit to the interpolation approaches described by [PERLIN, K., 1995. Real Time Responsive Animation with Personality, IEEE Transactions on Visualization and Computer Graphics; Vol 1 No. 1; WILEY, D. and HAHN, J., 1997. Interpolation Synthesis of Articulated Figure Motion, IEEE Computer Graphics and Applications, 17(6):39-45; ROSE, C. COHEN, M, and BODENHEIMER, B., 1998. Verbs and Adverbs: Multidimensional Motion Interpolation. IEEE Computer Graphics and Applications, 18(5):32-40, all of which are incorporated by reference herein]. One difference is that the described mechanism automatically computes proper foot placement for the interpolated movement.

For example, in one embodiment a walk with a sultry appearance can be defined by setting a small number of parameters: bring the elbows in, feet together, heels up, pelvis and shoulders forward, increase the arm swing and vertical pelvis bounce, and increase both the sway and axial rotation of hips and shoulders. The resulting walk automatically finds proper footfall positions for any path the virtual actor is directed to follow. In practice, fractional quantities of body language shadings such as sultriness can be mixed into an actor momentarily, as when a character is behaving in a seductive manner in order to catch the eye of another character.

In the sequence shown in FIG. 9, the virtual actor transitions between several idiomatic behaviors in a the span of a few steps: first from a shuffling old man, to a feral Gollum-like creature; then to a sultry walk. To create this sequence it was necessary only to specify the appropriate idiom at successive key frames. The original creation of each of the three component idioms required only a few minutes of parameter adjustment by an artist.

Types of Posture Variation

Posture parameters have been selected to provide intuitive isolated controls over those attributes of posture of a virtual actor that a trained actor or dancer might wish to independently modulate during a performance. A parameter can be either static, rhythmic, or stochastic Static parameters are those which are insensitive to the phase of the walk cycle. These include such postural properties as spacing between the feet, amount of bending at the knee, how much the toes are pointed, the axial twist of the pelvis, and how far forward or back the pelvis is thrust. Rhythmic parameters include amplitude of rolling shoulders or hips, the vertical bounce and thrust of the pelvis during the walk cycle, and the amplitude of arm swing. Stochastic parameters are postural parameters that are varied through time using a continuous pseudo-random function such as Perlin Noise [PERLIN, K., 1985. An Image Synthesizer, In Computer Graphics (Proceedings of ACM SIGGRAPH 85), 19, 4, ACM, incorporated by reference herein].

Blending Posture Parameters

As in [ROSE, C. COHEN, M, and BODENHEIMER, B., 1998. Verbs and Adverbs: Multidimensional Motion Interpolation. IEEE Computer Graphics and Applications, 18(5): 32-40, incorporated by reference herein], higher level parameter settings are mixed in as adverbs to convey a temporary change in a virtual actor's attitude when the virtual actor is being directed to perform a difficult or interesting task. For example, when the virtual actor is climbing or descending stairs, parameter settings are fractionally blended in to convey the idiomatic appearance of more careful and deliberate balancing (arms slightly raised, elbows out, feet apart and turned out, pelvis slightly lowered, shoulders hunched and forward, spine curved forward, heavy steps, slightly wandering gaze, slight wandering of path, slow pace, slightly staggered foot rhythm, high shakiness, very little movement in the hips). When reduced to practice, the resulting performance is surprisingly compelling.

Application

Production Advantages: Frame-Independent Evaluation and Path Following

Like any system that is based on a closed-form kinematic solution, the complete pose of the actor is a function of time which can be evaluated efficiently at any single input value of time. This confers the desirable properties that (1) the computation does not depend upon forward differencing between successive values of time, and (2) there is no variation in the behavior or body posture of the virtual actor due to variable animation frame rate, as defined in computations per second. Any individual frame in an animation can be computed and examined independently. Body posture and foot placement are completely determined and repeatable. This is a highly desirable property in a production animation setting, and a notable benefit of the current invention.

In addition, the path following is precise: the virtual actor is guaranteed to follow the exact path laid out by the specified keyframes. This is extremely important in situations containing tight physical constraints such as narrow doorways and hallways or tightly packed crowds. Precise path following is also essential for the use of virtual actors in implementing dance choreography, as well as in dramatic scenes in which the virtual actor needs to accurately hit its mark so that it will be properly framed in the camera shot. By analogy with the different components of the human brain, the virtual actor is constrained to function as pure cerebellum—an implementer of external cognitive choices. All actual cerebral cognitive decisions are directed by the animator or A.I. engine, and conveyed to the virtual actor within the parameter settings of successive keyframes.

Linear Animation Versus Real-Time Simulation

There are at least two distinct types of environments in which the described mechanism can be used: (1) the design of linear animation with a fixed set of key frames, and (2) interactive simulations, in which streams of key frames are continually provided by an A.I. program.

The body animation system itself, which is the embodiment of the current invention, is identical in both environments. This subsystem is always tasked with converting data from a small time window of keyframes into joint matrices. The difference between (1) and (2) lies entirely in the source of the keyframe data. For hand-tuned linear animation, parameters within a fixed set of keyframes are altered by a skilled animator/director. For interactive simulations, a moving window of temporary keyframes is generated by programs written by the A.I. designer of a game or simulation engine. (FIG. 10)

Interactive Crowd Simulation

The use of the described mechanism allows A.I. for a crowd simulation to be computed without any knowledge of the body animation system. Because the virtual actors are guaranteed to follow their marks precisely, it is possible to articulate large numbers of virtual actors without collisions and with repeatable results: each walking virtual actor will precisely follow the output position of the corresponding agent in the A.I. that directs the crowd.

In one embodiment interactive scenes containing 1000 dancing virtual actors have been implemented, with the entire animation, including both behavior and rendering computations, updating nine times per second. In this implementation the keyframe parameters for each virtual actor were randomized, so that each virtual actor dances with a unique personality and character. In FIG. 11*a*, a virtual computer graphic camera is flying through the crowd simulated in this implementation. As the camera approaches, the individual virtual actors in the camera's path turn toward the camera and dance out of the way, creating an aisle for the camera to travel through. In FIG. 11*b*, the crowd has made space for a lone dancer at center stage.

Figure 12B:
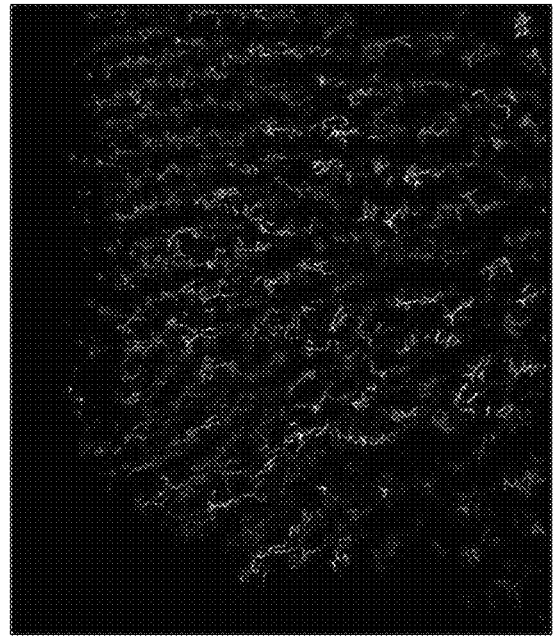
FIG. 12a and FIG. 12b show artificial intelligence agents and corresponding actors.
Figure 12A:
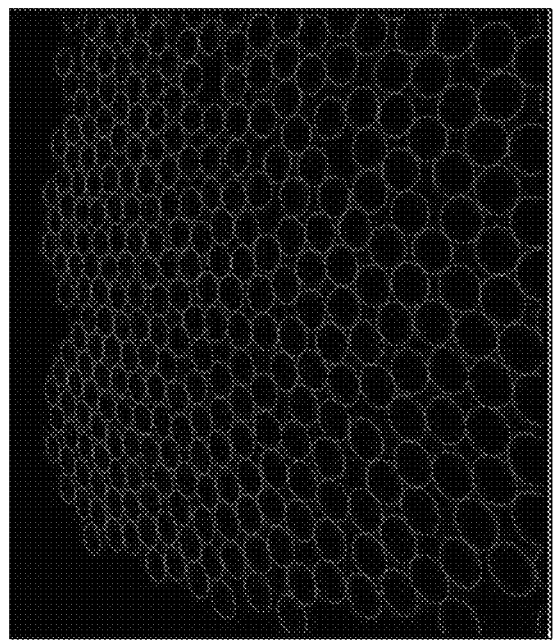

All of the behavior for the scene described above was computed via a separate 2D crowd simulation. FIGS. 12*a* and 12*b* show, side by side, a visualization of just the A.I. for that crowd simulation (FIG. 12*a*), and then of the virtual actors who are taking their position cues from that A.I. (FIG. 12*b*). For each virtual actor, the individual body posture, limb positions and foot placement are computed in a joint synthesis system enabled by this invention.

Performance

Because the described mechanism enables a closed-form mapping from parameters and target points to joint matrices, computation speed does not depend upon input values. In one embodiment, animated crowds consisting of up to 1000 interactive responsive virtual actors simultaneously, with each virtual actor set to a different setting of parameters, and therefore expressing a unique individual body posture have been implemented and tested. In benchmark tests on a 1.6 GHz Pentium-M notebook PC, this embodiment was able to evaluate 14,000 complete body postures per second. When displayed with OpenGL rendering of each actor, animation rates for 1000 actors at 9 frames per second, and for 500 actors at 18 frames per second are measured.

Using in Conjunction with Other Prior Work

The mechanism described herein is highly complementary to run-time animation engines that blend and overlay movement parameters through time with various degrees of transparency, such as the Improv System described by [PERLIN, K., and GOLDBERG, A., 1996. Improv: A System for Scripting Interactive Actors in Virtual Worlds, In Proceedings of ACM SIGGRAPH 1996 ACM Press/ACM SIGGRAPH, New York. Computer Graphics Proceedings, Annual Conference Series, ACM, incorporated by reference herein].

It is also straightforward to combine the mechanism described herein with a post-process refinement or energy minimization algorithm, such as those of [KO, H. and BADLER, N., 1996. Animating Human Locomotion in Real-time using Inverse Dynamics, Balance and Comfort Control. IEEE Computer Graphics and Applications, 16(2): 50-59; COHEN, M., 1992. Interactive spacetime control for animation. In Computer Graphics (Proceedings of ACM SIGGRAPH 92), 26, 4, ACM, 293-302; GLEICHER, M., 1997. Motion editing with spacetime constraints. In Proc. of Symposium on Interactive 3D Graphics, all of which are incorporated by reference herein] and their successors, as well as adjustment by model-based terrain-following footstep placement algorithms such as those of [CHUNG, S., and HAHN J., 1999. Animation of Human Walking in Virtual Environments. In Proc. Int. Conf. on Computer Animation, pages 4-15. IEEE, incorporated by reference herein]. In such a combination, the mechanism presented herein could be used for interactive placement and choreography of figures, with complementary post-processing techniques being applied off-line for final animation productions.

An enabling mechanism has been described that unifies foot placement with kinematic control of an ambulatory virtual humanoid actor. The same mechanism can be generalized to quadruped, hexapod, octopod virtual actors, and so forth, by replacing the single pair of feet with multiple pairs of feet. One benefit of the described mechanism is that the unification of foot placement and body posture makes it much easier for programmers to create procedural mechanism for expressing body language that are intuitive and useful for use by artists. The resulting mechanism always produces foot placement that is well matched to body posture. This mechanism also allows all aspects of body posture to be computed with low computational expense. This computation can be performed independently for any point in time. The mechanism is well suited to real-time simulations containing hundreds of virtual actors, in which each virtual actor possesses expressive and responsive body posture customized for its particular simulated identity, personality and situation.

This mechanism can be very effectively combined with behavioral level of detail, in which foreground actors are articulated with greater fidelity, and background actors, which are smaller in the camera frame, are articulated more approximately. Behavioral level of detail is useful because beyond the first several hundred actors, members of a simulated crowd who appear in a wide shot effectively appear as indistinct blobs. When used together with variable level of behavioral detail, the mechanism described herein could support real-time responsive emotively expressive behavior for crowds of essentially unlimited size, on commodity level computers.

The mechanism described herein is also compatible with techniques that enforce physical realism through constraints on parameter settings. In one embodiment, energy costs of various transitions can be computed off-line, and used to train a corpus-based method such as Convolution Networks that recognizes time-series patterns [LECUN, Y. and BENGIO, Y., 1995. Convolutional Networks for Images, Speech, and Time-Series, in The Handbook of Brain Theory and Neural Networks, (M. A. Arbib, ed.), incorporated by reference herein], to identify desired correlations between parameter values in successive keyframes. For example, just before an actor leaps high in the air, the previous keyframe can be constrained to consistently brace for the jump by crouching. Adding such pre-filters does not compromise the computational speed of the described mechanism; the combination of the described mechanism with corpus-based trainable methods is useful for applications that require physical realism.

There are numerous commercial software packages that enable character animation of bipeds. The following are representative and well known.

| Company | Product Name |
| --- | --- |
| Alias | Maya |
| SoftImage | SoftImage |
| Discreet | 3D Studio Max Character Studio |
| Rad Game Tools | Granny |

All of these packages enable the bipedal virtual actor structure that is described in the background material. None of them use the new temporal phase shifting.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for creating a computer simulation of a crowd carried out by a computer comprising computer generated steps of:
   animating a plurality of virtual actors simultaneously with each virtual actor set to a different setting of parameters and therefore expressing a unique individual body posture and key frame parameters for each virtual actor being randomized; and
   displaying the computer simulation.

2. An apparatus for creating a computer simulation of an actor comprising:
   a computer; and a software program disposed on a computer readable medium that is run by the computer which then performs computer generated steps of:
   depicting the actor based on a plurality of postural parameters of the actor which include how far apart the actor's feet are, a degree of bending of the actor's knees, how far back the actor's shoulders are, and how much the actor's hips are swaying from side to side when the actor is walking along a path laid out by specified key frames; and
   changing a position of the actor.

3. A method for creating a computer simulation of an actor comprising steps of:
   having the actor move subject to a first idiomatic behavior regarding a pelvis and a rythmic parameter which includes amplitude of arm swing for a first set of a plurality of successive key frames;
   transitioning the actor to move to a second idiomatic behavior for a second set of a plurality of successive key frames by only specifying the second idiomatic behavior for the second set of the plurality of successive key frames, the second idiomatic behavior different from the first idiomatic behavior along with a change in attitude of the actor; and
   having the actor move subject to the second idiomatic behavior for the plurality of the second set of successive key frames.

* * * * *